(12) United States Patent
Davis et al.

(10) Patent No.: US 12,047,765 B2
(45) Date of Patent: Jul. 23, 2024

(54) SYSTEM AND METHOD FOR WIRELESS AUDIO AND DATA CONNECTION FOR GAMING HEADPHONES AND GAMING DEVICES

(71) Applicant: HARMAN INTERNATIONAL INDUSTRIES, INCORPORATED, Stamford, CT (US)

(72) Inventors: Devon Davis, Novi, MI (US); Dave Olsen, Murphy, TX (US); Kadagattur Gopinatha Srinidhi, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 137 days.

(21) Appl. No.: 17/740,730

(22) Filed: May 10, 2022

(65) Prior Publication Data

US 2022/0360934 A1 Nov. 10, 2022

Related U.S. Application Data

(60) Provisional application No. 63/186,477, filed on May 10, 2021.

(51) Int. Cl.
*H04S 7/00* (2006.01)
*H04R 1/10* (2006.01)
(Continued)

(52) U.S. Cl.
CPC .......... *H04S 7/304* (2013.01); *H04R 1/1041* (2013.01); *H04R 1/1091* (2013.01); *H04R 5/04* (2013.01);
(Continued)

(58) Field of Classification Search
CPC ........ H04S 7/304; H04S 5/04; H04S 2400/13; H04S 7/306; H04S 1/007; H04S 2420/01; H04S 2400/11; H04R 1/1041; H04R 1/1091; H04R 5/04; H04R 2400/13; H04R 5/033; H04R 2430/01; H04R 1/1083; H04R 2201/107; H04R 2420/07; H04R 2201/10;
(Continued)

(56) References Cited

U.S. PATENT DOCUMENTS

| | | | |
|---|---|---|---|
| 10,432,773 B1* | 10/2019 | Tong | H04R 1/1041 |
| 2010/0002893 A1* | 1/2010 | Theverapperuma | H04R 1/1083 381/370 |
| 2010/0040240 A1* | 2/2010 | Bonanno | H04S 1/005 381/74 |
| 2010/0290636 A1* | 11/2010 | Mao | H04S 7/304 381/74 |

(Continued)

*Primary Examiner* — Yogeshkumar Patel
(74) *Attorney, Agent, or Firm* — Brooks Kushman P.C.

(57) ABSTRACT

In at least one embodiment, an audio system is provided. At least one controller is programmed to encode a first and second audio component and to generate a first and a second encoded audio component. The at least one controller is programmed to apply a first gain to at least one of the first encoded audio component and the second encoded audio component to generate at least one of a first and second increased encoded audio component and to decode the at least one of the first and the second increased encoded audio component to generate at least one of a first and second decoded audio component. The at least one controller is further programmed to amplitude pan the at least one of the first and the second decoded audio component to increase a stereo width for an audio output transmitted by a first loudspeaker and a second loudspeaker.

20 Claims, 2 Drawing Sheets

(51) Int. Cl.
*H04R 5/04* (2006.01)
*H04W 88/04* (2009.01)
*H04W 88/06* (2009.01)

(52) U.S. Cl.
CPC ...... *H04R 2420/07* (2013.01); *H04S 2420/01* (2013.01); *H04W 88/04* (2013.01); *H04W 88/06* (2013.01)

(58) Field of Classification Search
CPC ..... H04W 88/04; H04W 88/06; H04W 8/245; H04W 4/18; H04W 52/283; H04L 5/003; H04L 5/0098; H04M 1/6066
USPC .......................................................... 700/94
See application file for complete search history.

(56) References Cited

U.S. PATENT DOCUMENTS

| | | | |
|---|---|---|---|
| 2013/0182641 A1* | 7/2013 | Maguire | H04B 17/318 370/328 |
| 2013/0260737 A1* | 10/2013 | Sampat | G06F 9/44526 455/418 |
| 2013/0322348 A1* | 12/2013 | Julian | H04N 21/4384 370/329 |
| 2014/0031122 A1* | 1/2014 | Peng | A63F 13/332 463/35 |
| 2014/0119582 A1* | 5/2014 | Jia | H04J 3/0682 375/138 |
| 2016/0142848 A1* | 5/2016 | Saltwell | H04S 1/002 381/17 |
| 2021/0219089 A1* | 7/2021 | Sim | A63F 13/25 |

* cited by examiner

SYSTEM AND METHOD FOR WIRELESS AUDIO AND DATA CONNECTION FOR GAMING HEADPHONES AND GAMING DEVICES

CROSS-REFERENCE TO RELATED APPLICATIONS

This application claims the benefit of U.S. provisional application Ser. No. 63/186,477 filed May 10, 2021, the disclosure of which is hereby incorporated in its entirety by reference herein.

TECHNICAL FIELD

Aspects disclosed herein generally related to a system and method for wireless audio and data connection for gaming headphones (or loudspeakers) and gaming devices. While such aspects may correspond to gaming headphones and gaming devices, it is recognized that the aspects noted herein may be applicable to any headphones (or wireless loudspeakers) that play back media and to a media controller that transmits media to such headphones and/or loudspeakers in general. These aspects and others will be discussed in greater detail herein.

BACKGROUND

A consumer preference for wireless devices such as gaming headphones, for example, require the need to support low latency connections. Additional challenges also exist for gaming headphones. For example, the gaming headphones need to provide a stereo audio channel for loudspeakers that are operably coupled thereto and a return audio channel for a microphone of the gaming headphones need to be supported as well. Additionally, gaming headphones require a data channel to handle status updates such a battery state and button presses. To provide an immersive gaming experience, the data channel also needs to be low latency to handle timing to react to head tracking and position tracking information from the headphones.

SUMMARY

In at least one embodiment, a system for wireless audio and data transmission is provided. The system includes a computing device, a first transceiver, a second transceiver, and headphones. The computing device is programmed to generate an audio signal. The first transceiver is operably coupled to the computing device and programmed to wirelessly transmit the audio signal over a ultrawide band (UWB) frequency range. The second transceiver is programmed to wirelessly receive the audio signal over the UWB frequency range. The headphones are programmed to receive the audio signal and playback the audio signal.

In at least another embodiment, a method a system for wireless audio and data transmission is provided. The method includes generating an audio signal via a computing device and wirelessly transmitting via a first transceiver, the audio signal over a ultrawide band (UWB) frequency range. The method further includes wirelessly receiving via a second receiver the audio signal over the UWB frequency range and playing back the audio signal via headphone after wirelessly receiving via the second receiver the audio signal over the UWB frequency range.

In at least another embodiment, a computer-program product embodied in a non-transitory computer readable medium that is programmed for wireless audio and data communication is provided. The computer-program product includes instructions to generate an audio signal via a computing device and wirelessly transmit via a first transceiver, the audio signal over a ultrawide band (UWB) frequency range. The computer-program product further includes instructions to wirelessly receive via a second receiver the audio signal over the UWB frequency range and to play back the audio signal via a wireless loudspeaker after receiving via the second receiver the audio signal over the UWB frequency range.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
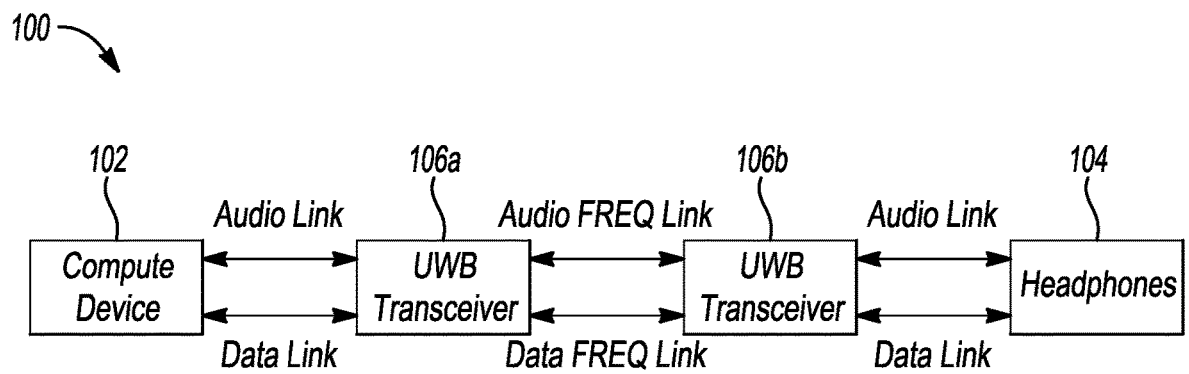
FIG. 1 depicts a system for wireless audio and data connection in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, gaming headphones may come in two variations. In a first variation, gaming headphones may include full bandwidth audio plus at least one head tracking device that is electrically coupled to a gaming device. This first variation achieves low latency and excellent audio quality and more advantageously provides an immersive gaming experience through head tracking. In one example, a low latency may be defined as a latency time that is less than 10 ms. In this example, such a latency may be applicable for serious gamers. In yet another example, the latency time may be up to 50 ms. In this example, such a latency may be applicable to casual gamers. Each of the gaming headphones and the gaming device (or computing device) may include, for example, at least one 2.4 GHz based transceivers. The first variation utilizes this frequency range to keep the latencies low. However, it is recognized that the audio may be subject to some compression. The first variation may not include head tracking support that is integrated in either (or coupled to) the gaming device or the gaming headphones.

Aspects disclosed herein provide that the gaming headphones and the computing device communicate with one another via Ultra-wideband (UWB). In general, the gaming headphones and the computing device may engage in bidirectional communication utilizing a frequency of over 500 MHz. This enables for the transmission of a large amount of signal energy without interfering with narrowband and carrier wave transmission in the same frequency band. It is recognized that UWB based gaming headphones provide for latencies that are lower than other known solutions. Similarly, UWB based communications between the headphones and the computing device keep audio quality high and support low latency head-tracking in the wireless mode. With at least a pair of UWB wireless transceivers, it is possible to dedicate one to a host connection and the other to the headphones or controller connection. The UWB based communication interface between the headphones and the computing device enables audio data transmission in both directions with loudspeaker audio from the host to the controller and microphone audio from the controller to the host.

A UWB based communication protocol for the gaming headphones and the computing device facilitates a low data rate, bidirectional communication, and a UWB data channel to support headphone status and tracking information. UWB may be well suited for gaming applications since UWB provides: (i) a bandwidth that allows uncompressed data, (ii) a low/deterministic latency that allows predictable real-time performance, immunity to interference, and (iii) a low frequency range which prevents interference from other devices. In addition, UWB may also be well suited for gaming applications since UWB requires less power than other communication protocols such as BLUETOOTH or WIFI. It is recognized that a UWB based communication protocol may also be employed between the computing device and any number of wireless loudspeakers.

FIG. 1 depicts a system 100 for wireless audio and data connection in accordance with one embodiment. The system 100 includes a computing device 102 and headphones (or loudspeaker) 104. It is recognized that any references to the headphones 104 as set forth herein may also apply to wireless loudspeaker(s) that may be operably coupled to the computing device 102. The computing device 102 and the headphones 104 engage in bi-directional communication via UWB communication interface. In one example, the computing device 102 may be any electrical device that processes information (via one or more controllers (not shown) to provide gaming functionality for a user (gamer, player, etc.). The computing device 102 may be a gaming console (e.g., X-Box®, a laptop, a tablet, a cell phone, etc.). The headphones 104 may be gaming headphones and support head tracking capabilities.

As noted above, the computing device 102 and the headphones 104 engage in bi-directional via the UWB communication interface. In this regard, a first UWB transceiver 106a may be integrated with the computing device 102 to enable bi-directional communication via UWB with the headphones 104. Alternatively, the first UWB transceiver 106a may be plugged into the computing device 102 to facilitate communication with the headphones 104. Similarly, a second UWB transceiver 106b may be integrated with the headphones 104 to enable bi-directional communication with the first UWB transceiver 106a associated with the computing device 102. Alternatively, the second UWB transceiver 106b may be plugged into the headphones 104 to facilitate communication with the computing device 102.

The system 100 illustrates that the computing device 102 and the headphones 104 may bi-directionally transmit and receive information corresponding to audio information (e.g., audio link) and data information (e.g., data link). For example, the computing device 102 may transmit audio to the headphones 104 via the first and the second UWB transceivers 106a and 106b (e.g., over radio frequencies (RF) as set forth or defined by the UWB) on the audio link. Such audio may coincide with a video game that is being played by the user while wearing the headphones 104. The headphones 104 may then play back the audio as received over the audio link for the user. The first UWB transceiver 106a and the second UWB transceiver 106b wirelessly transmit the audio information and data to one another over a wireless interface at a specified frequency in the UWB. As noted above, transmission on the UWB may enable a low latency to achieve a latency time that is less than 10 ms. In this example, such a latency may be applicable for serious garners. In yet another example, the latency time may be up to 50 ms.

In one example, the headphones 104 may detect the location of the user's head as the user's head moves about a 360-degree polar coordinate system while playing the video game and transmit data indicative of the position of the user's head to the computing device 102. For example, the headphones 104 may transmit data corresponding to a rotational position of the user's head (e.g., facing front or back). In turn, the computing device 102 may process audio based on the location of the user's head and transmit the audio to the user based on the detected position of the user's head to provide spatial audio processing for the user based on the location of the user's head.

Additional information with respect to the manner in which data and audio is transmitted between the computing device 102 and the headphones 104 is set forth below. For example, the computing device 102 transmits packets of data (e.g., either audio data or other data command/status, etc.) to the first UWB transceiver 106a. Prior to the actual transmission, the first UWB transceiver 106a converts the data into a format suitable for UWB transmission and wirelessly transmits such data to the headphones 104. The first UWB transceiver 106a may place the data in packets for UWB transmission prior to transmission to the headphones 104. Alternatively, the first UWB transceiver 106a may encrypt the data prior to transmission. In this example, the second UWB transceiver 106b (or the headphones 104) may decrypt the encrypted data prior to the headphones 104 playing back the data for the user. The second transceiver 106b translates the received audio or data while in the UWB format into a format that is suitable for processing by the headphones 104. The headphones 104 may transmit data such a battery state thereof and so on. The headphones 104 may also transmit information corresponding to the distance between the first and the second transceivers 106a-106b. In addition, the headphones 104 may also provide auditory cues to aid the user.

Figure 2:
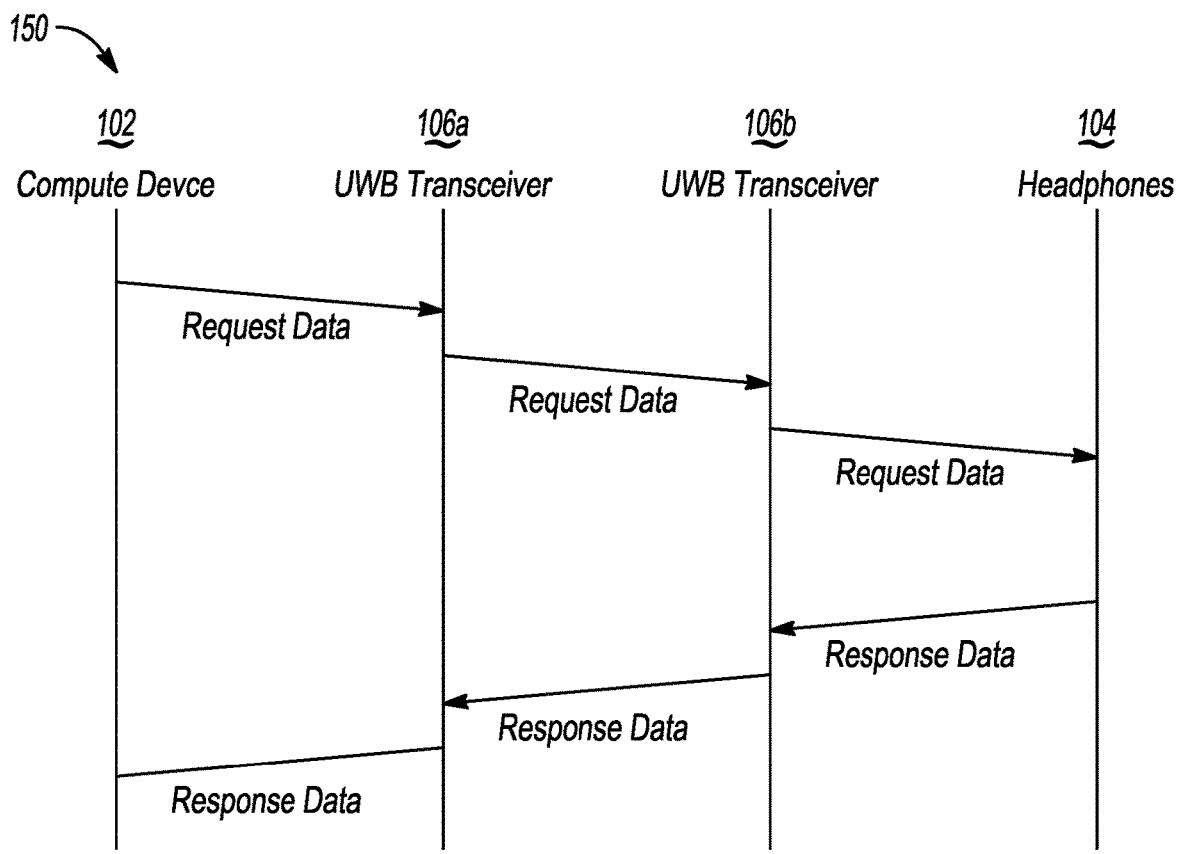
FIG. 2 depicts a first signal flow diagram between one or more gaming controllers (or computing devices) and a gaming headphone in accordance with one embodiment.

FIG. 2 depicts a first signal flow diagram 150 between the computing device 102 (or gaming computing device) and the headphones 104 (or gaming headphones) in accordance with one embodiment. The diagram 150 generally illustrates that the computing device 102 may transmit a request command (or "RequestData") to the headphones 104 via the first and the second UWB transceivers 106a-106b. In response to the request command, the headphones 104 may transmit response data which is indicative of a response provided by the headphone 104. As noted above, the headphones 104 may transmit head location information to the computing device 102. In this case, the headphones 104 may transmit such data on an event basis (e.g., when the head of the user is detected to have changed positions or periodically over time). The headphones 104 may also provide microphone data (e.g., voice or other audio captured by a microphone positioned on the headphones 104 (or a microphone that is operably coupled with the headphones 104)) to the computing device 102.

It is recognized that the computing device 102 may also determine the distance to the headphones 104. For example, the first UWB transceiver 106a may utilize time of flight (TOF) or arrival time of the received signals from the headphones 104 to determine the distance between the computing device 102 and the headphones 104. In general, UWB based transceivers may perform TOF measurements or determine the arrival time based on the length of time that a signal is transmitted from the computing device 102 to the headphones 104 and the length of time for a signal to travel back from the headphones 104 to the computing device 102. The first UWB transceiver 106a may determine the distance and then transmit information indicative of the distance between the computing device 102 and the headphones 104. The computing device 102 may then adjust the audio playback (or modify an audio transfer function (e.g., reverb, time delay, amplitude, etc.)) based on the distance between the computing device 102 and the headphones 104. For example, the computing device 102 may modify the audio transfer function based on the distance between the user (or gamer) (e.g., based on the headphones 104 positioned on the user's head) and a screen (not shown) of the computing device 102. The computing device 102 may optionally add reverb and/or modify the EQ of the audio output therefrom. This aspect provides the user with an auditory perception of distance from a sound source (e.g., from the computing device 102).

Figure 3:
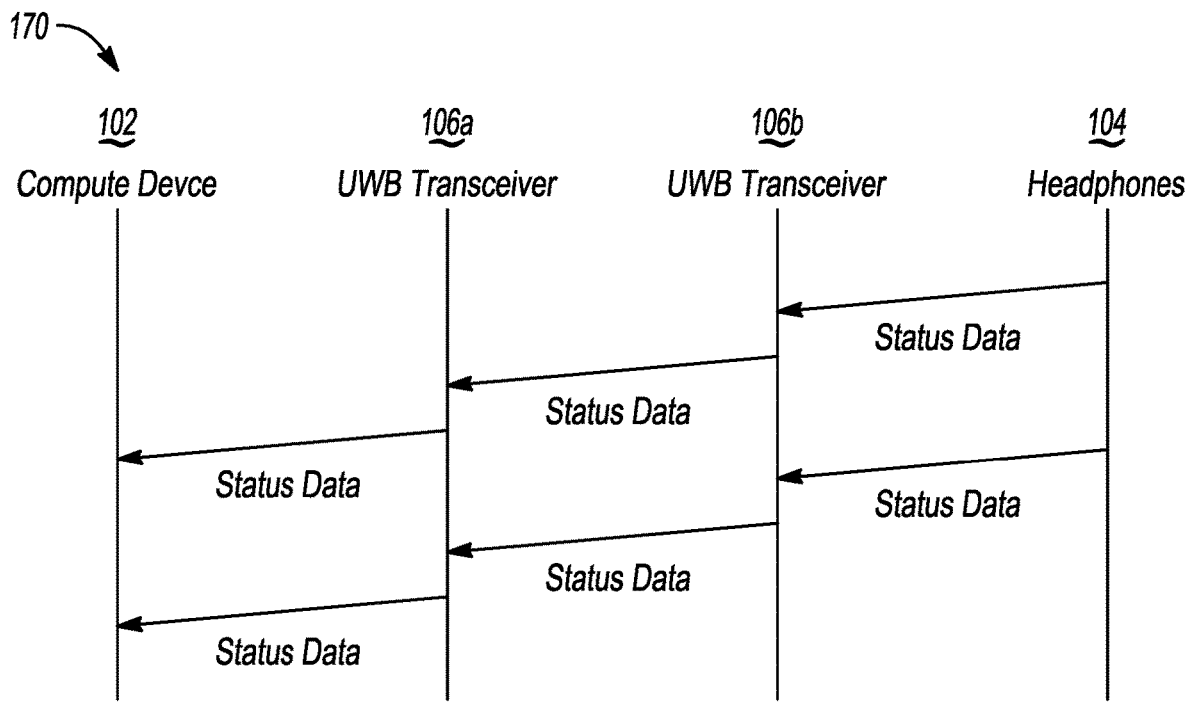
FIG. 3 depicts a second signal flow diagram between the one or more gaming controllers and the gaming headphone in accordance with one embodiment.

FIG. 3 depicts a second signal flow diagram 170 between the computing device 102 (or gaming computing device) and the headphones 104 (or gaming headphones) in accordance with one embodiment. The diagram 170 generally illustrates that the headphones 104 may transmit status data to the headphones 104 via the first and the second UWB transceivers 106a-106b without a request from the computing device 102. In this case, the headphones 104 may transmit the status data periodically or on an event-based basis. In general, the headphones 104 may transmit the status data to the second UWB transceiver 106b. The second UWB transceiver 106b may then convert the status data into a UWB format that is suitable for transmission therefrom to the computing device 102. The first UWB transceiver 106a converts the status data into a format that is suitable for processing by the computing device 102.

In one example, the status data as transmitted by the headphones 104 may correspond to a position of the user's head while gaming. As noted above, the headphones 104 may detect the location of the user's head as the user's head moves about a 360-degree polar coordinate system while playing the video game and transmit such data as status data indicative of the position of the user's head to the computing device 102. In turn, the computing device 102 may process audio based on the location of the user's head and transmit the audio to the user based on the detected position of the user's head to provide spatial audio processing for the user based on the location of the user's head. In one example, the computing device 102 may adjust reverb, amplitude, and/or a time delay of the audio output provided therefrom to the headphones 104 to modify the spatial audio (or audio transfer function) for the user of the headphone 104. It is recognized that the user's head will turn in a number of orientations while gaming and it is further recognized that that the spatial audio provided by the computing device 102 may require modifications or adjustments to ensure that the user is hearing the audio in a manner consistent with his/her head position. For example, the user may turn his/her head all the way to the left and it will be necessary for the computing device 102 to process the audio data such that the headphones 104 plays back the audio in front of the user's head for the right ear and plays back the audio data on a rear side of the user's head for the left ear.

Figure 4:
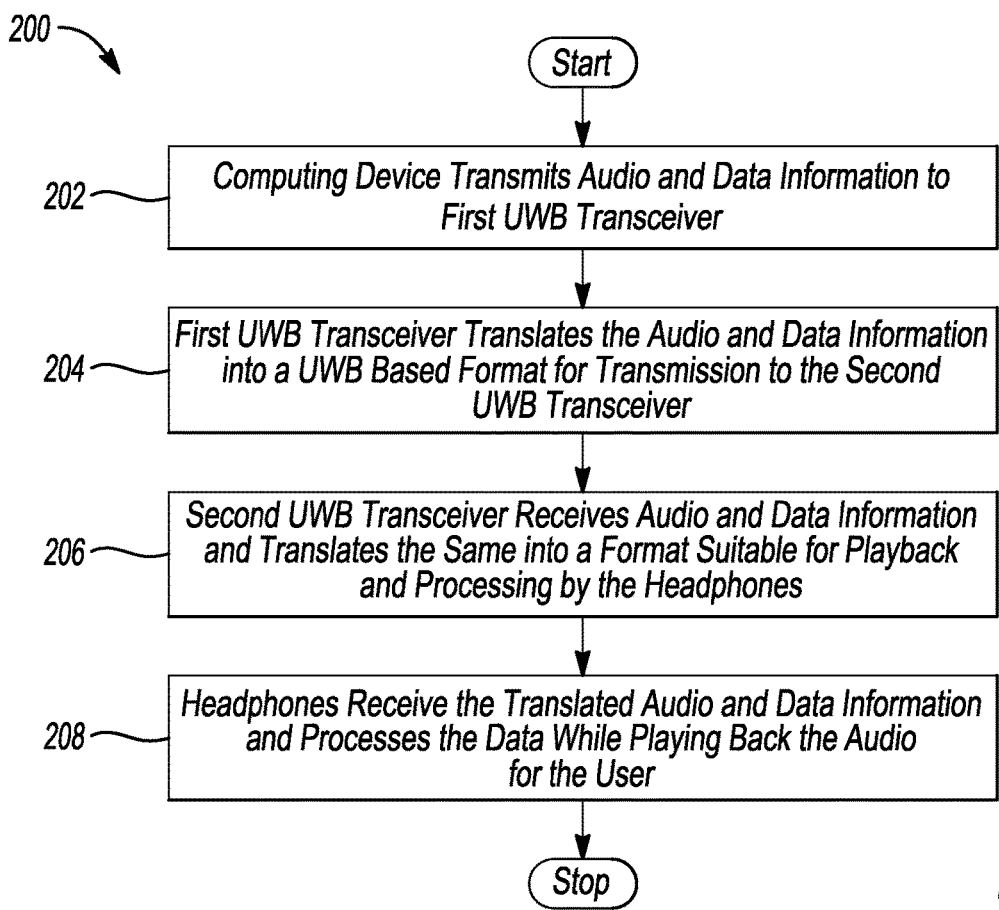
FIG. 4 depicts a method for wireless audio and data connection in accordance with one embodiment.

FIG. 4 depicts a method 200 for wireless audio and data connection in accordance with one embodiment.

In operation 202, the computing device 102 transmits audio and data information to the first UWB transceiver 106a prior to such information being wirelessly transmitted to the headphones 104. The computing device 102 may calculate an appropriate audio content based on a Head Response Transfer Function (HRTF). In general, HRTF is computed based on head location information as received from the headphones 104. The appropriate audio is streamed from the computing device 102 to the headphones 104.

In operation 204, the first UWB transceiver 106a translates (or converts) the audio and data information into a UWB based format for transmission to the second UWB transceiver 106b. The first UWB transceiver 106a wirelessly transmits the same to the second UWB transceiver 106b.

In operation 206, the second UWB transceiver 106b receives the audio and data information and translates the same into a format that is suitable for playback and processing by the headphones 104. The second UWB transceiver 106 transmits the translated audio and data information to the headphones 104.

In operation 208, the headphones 104 receives the translated audio and data information and processes the same. The headphones 104 play back the audio for the user while playing the game.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for wireless audio and data transmission, the system comprising:

a computing device programmed to generate an audio signal;

a first transceiver operably coupled to the computing device and programmed to wirelessly transmit the audio signal over an ultrawide band (UWB) frequency range;

a second transceiver being programmed to wirelessly receive the audio signal over the UWB frequency range; and headphones being programmed to receive the audio signal and playback the audio signal, wherein the first transceiver is further programmed to determine a distance between the computing device and the headphones based at least on a first length of time a first signal is transmitted from the computing device to the headphones and a second length of time a second signal is transmitted from the headphones to the computing device.

2. The system of claim 1, wherein the computing device is further programmed to (i) receive a distance signal indicative of the distance, and (ii) one or more of a reverb, a time delay, and an amplitude of the audio signal based on the distance.

3. The system of claim 1, wherein the headphones are further programmed to detect a position of a user's head and transmit a data signal indicative of the position of the user's head to the computing device over the UWB frequency range.

4. The system of claim 3, wherein the headphones are further programmed to transmit the data signal indicative of the position of the user's head to the computing device at a latency that is below 50 ms.

5. The system of claim 1, wherein the computing device is further programmed to adjust one or more audio transfer functions of the audio signal in response to a data signal.

6. The system of claim 5, wherein the computing device is further programmed to transmit the audio signal with the adjusted one or more audio transfer functions to the headphones over the UWB frequency range.

7. The system of claim 1, wherein the headphones are gaming headphones.

8. A method for wireless audio and data transmission comprising:

generating an audio signal via a computing device;

wirelessly transmitting via a first transceiver, the audio signal over a ultrawide band (UWB) frequency range;

wirelessly receiving via a second receiver the audio signal over the UWB frequency range;

playing back the audio signal via headphones after wirelessly receiving via the second receiver the audio signal over the UWB frequency range; and determining a distance between the computing device and the headphones based at least on a first length of time a first signal is transmitted from the computing device to the headphones and a second length of time a second signal is transmitted from the headphones to the computing device.

9. The method of claim 8 further comprising:

adjusting one or more of a reverb, a time delay, and an amplitude of the audio signal based on the distance.

10. The method of claim 8 further comprising:

detecting a position of a user's head while the headphones are positioned on the user's head; and transmitting a data signal indicative of the position of the user's head to the computing device over the UWB frequency range.

11. The method of claim 10 further comprising transmitting the data signal indicative of the position of the user's head to the computing device at a latency that is below 50 ms.

12. The method of claim 8 further comprising adjusting one or more audio transfer functions of the audio signal in response to a data signal.

13. The method of claim 12 further comprising transmitting the audio signal with the adjusted one or more audio transfer functions to the headphones over the UWB frequency range.

14. The method of claim 8, wherein the headphones are gaming headphones.

15. A computer-program product embodied in a non-transitory computer readable medium that is executable by at least one controller for wireless audio and data communication, the computer-program product comprising instructions to:

generate an audio signal via a computing device;

wirelessly transmit, via a first transceiver, the audio signal over a ultrawide band (UWB) frequency range;

wirelessly receive, via a second receiver, the audio signal over the UWB frequency range;

play back the audio signal via headphones after receiving the audio signal over the UWB frequency range from the second receiver; and determine a distance between the computing device and the headphones based at least one a first length of time a first signal is transmitted from the computing device to the headphones and a second length of time a second signal is transmitted from the headphones to the computing device.

16. The computer-program product of claim 15 further comprising instructions to:

adjust one or more of a reverb, a time delay, and an amplitude of the audio signal based on the distance.

17. The computer-program product of claim 15 further comprising instructions to:

detect a position of a user's head while the headphones are positioned on the user's head; and transmit a data signal indicative of the position of the user's head to the computing device over the UWB frequency range.

18. The computer-program product of claim 17 further comprising instructions to transmit the data signal indicative of the position of the user's head to the computing device at a latency that is below 50 ms.

19. The computer-program product of claim 15 further comprising instructions to adjust one or more audio transfer functions of the audio signal in response to a data signal.

20. The computer-program product of claim 19 further comprising instructions to transmit the audio signal with the adjusted one or more audio transfer functions to the headphones over the UWB frequency range.

* * * * *